July 15, 1969  C. LABARTINO ET AL  3,456,236
BRAKE SHOE WEAR INDICATOR
Filed April 20, 1966  2 Sheets-Sheet 2
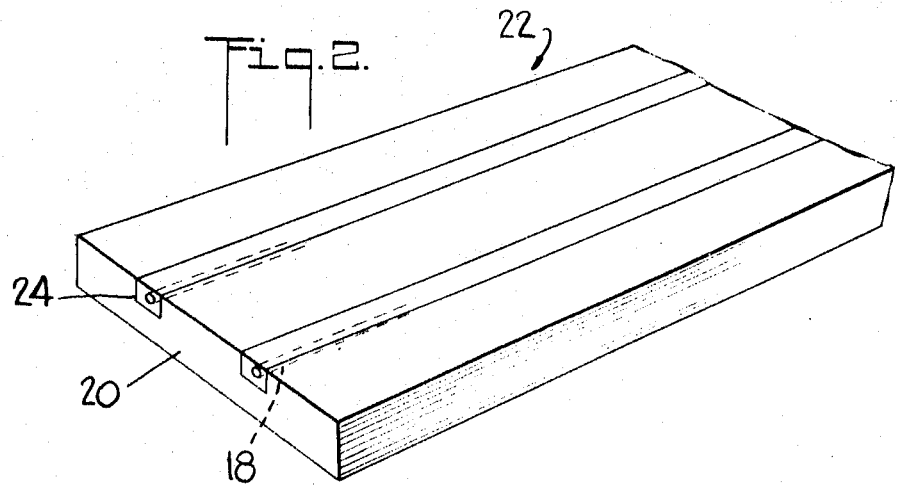
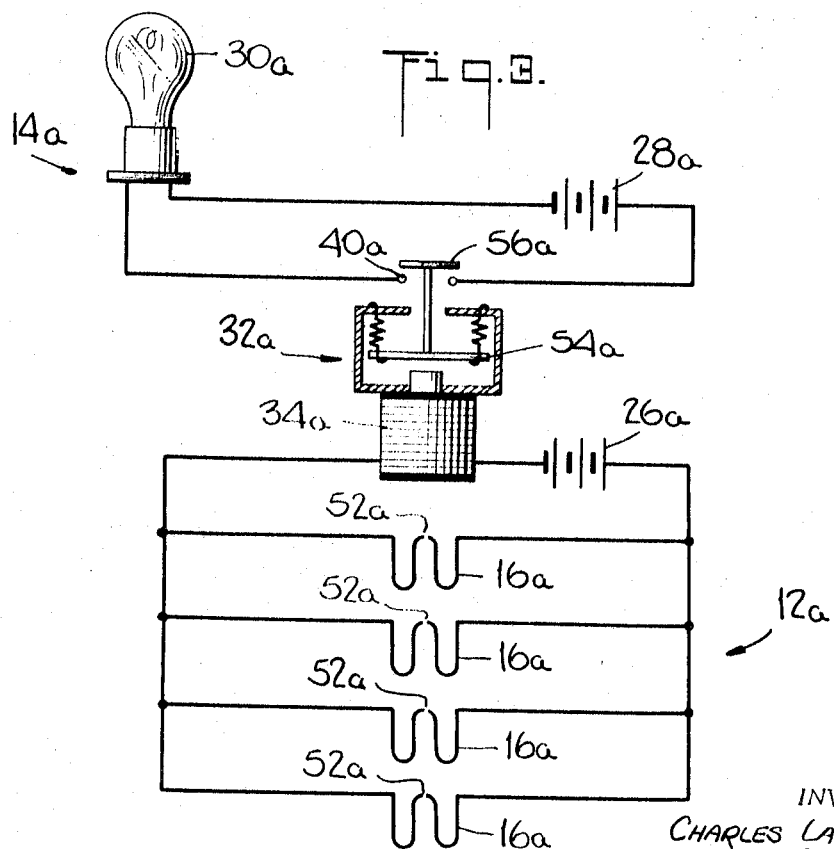
INVENTORS
CHARLES LABARTINO
BY JOSEPH DESCOVICH
ATTORNEY

United States Patent Office 3,456,236
Patented July 15, 1969

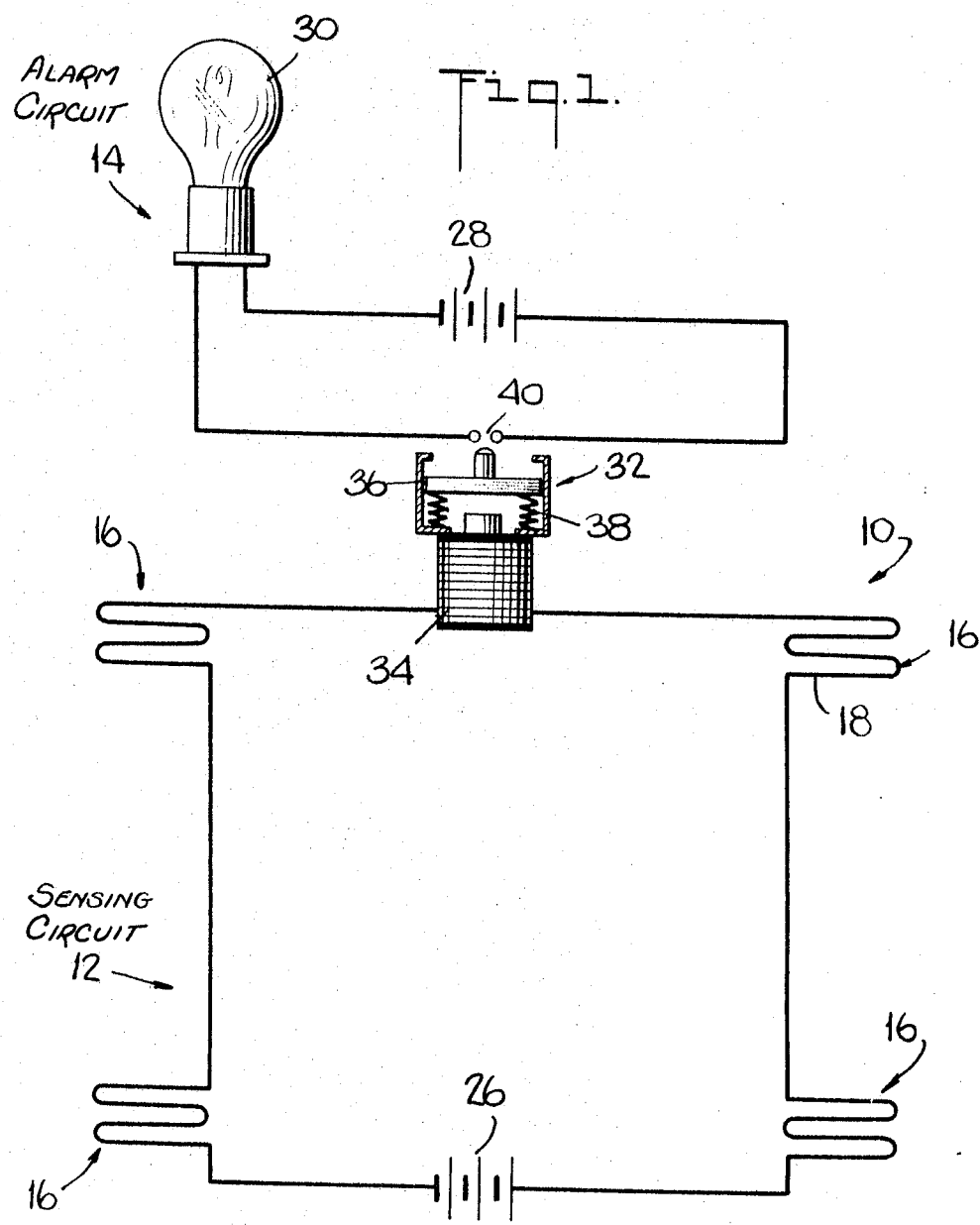

3,456,236
BRAKE SHOE WEAR INDICATOR
Charles Labartino and Joseph Descovich, both of 47—06 160th St., Flushing, N.Y. 11358
Filed Apr. 20, 1966, Ser. No. 544,031
Int. Cl. B60t 17/22
U.S. Cl. 340—52                    5 Claims

ABSTRACT OF THE DISCLOSURE

This invention relates to brake wear detector for detecting the depth of wear of a brake shoe. The detector has a sensing circuit disposed at a predetermined depth in a brake shoe. The sensing circuit has therein connected in series a source of power and a switch. The switch is also part of an alarm circuit which has connected in series a second power source and an alarm means. The sensing circuit is normally closed and the alarm circuit is normally open so that as the brake shoe wears beyond the depth at which the sensing circuit is set, the sensing circuit is broken on which breaking activates the switch to close the alarm circuit thereby activating the alarm.

---

This invention relates generally to wear indicators and more particularly to a brake shoe wear indicator.

Heretofore, it has been known that it would be an exceptional safety feature in automobiles and the like if the brake shoe wear of the brake system could be detected prior to the brake shoe failure point. There have been several attempts to provide indicator devices to indicate the brake shoe wear and to prevent wear from reaching the brake failure point. However, all these devices have not gained wide commercial acceptance and use because they have been either complex in structure and/or difficult to operate and always constituted a great number of components that were subject not only to easy damage but were also subject to inaccurate calibration.

Alternatively as shown in FIGURE 3 the teaching of the present invention can be accomplished by a sensing circuit 12a having in series a switch means 32a and a power source such as a battery 26a, and in parallel across the power source 26a a series of activating means 16a such as conductors that can be disposed in the brake linings of an automobile brake shoe. The conductors have a discontinuity or break as is shown at 52a. As is understood by those skilled in the art no current will normally flow in the sensing circuit 12a. The switch means 32a is of the type that has an electromagnetic 34a which when activated will attract a plate 54a to cause a contact 56a on the plate to be placed across the poles 40a to close the normally open alarm circuit 14a and to activate the alarm means 30a. The activating means 16a are constructed and arranged in the brake shoe so that as the brake shoe wears to a maximum permissible depth and/ or any of the conductors become exposed, the brake shoe will make contact across the break 52a which will serve to complete the sensing circuit 12a to allow current to flow therein and to actuate the switch means 32a with attendant actuation of the alarm means 30a.

It is the general object of the present invention to avoid and overcome the foregoing and prior art practices by the provision of an automobile brake shoe wear indicator comprising a simple design with a small number of components.

Another object of the present invention is to provide an automobile brake shoe indicator which will not be easily subjected to damage from shock.

Still another object of the present invention is to provide an automobile brake shoe indicator that is relatively inexpensive and can maintain good accuracy of calibration.

The objects of this invention are achieved by providing apparatus for detecting the depth of wear of a brake shoe which apparatus has a sensing circuit disposed in part at a predetermined depth in the brake shoe and a sensing circuit having in series a power source and a switch means. In addition, an alarm circuit is provided which is connected to the switch means and is constructed and arranged to be activated by the switch means. The alarm circuit has in series a power source and alarm means arranged to be actuated as the alarm circuit is actuated by the switch means with the switch means in turn being constructed and arranged to actuate the alarm circuit when the brake shoe wears to the predetermined depth. For a better understanding of this invention reference should be had to the following drawings wherein like numerals of reference indicate similar parts and wherein:

FIGURE 1 is a diagrammatic sketch of the electrical system of the present invention;

FIGURE 2 is a part prospective view illustrating a brake shoe and circuit wires disposed therein;

FIGURE 3 is a diagrammatic view illustrating the circuit of an alternative embodiment of the present invention.

With specific reference to the form of the present invention illustrated in the drawings and referring particularly to FIGURE 1, a wear detector circuit assembly as indicated generally by the FIGURE 10. The wear detector circuit assembly 10 comprises of two circuits, a sensing circuit 12 and an alarm circuit 14. The sensing circuit 12 comprises in series an activating means 16 to serve as an actuator for the alarm circuit 14.

The activating means 16 are wire conductors 18 than can be disposed within, as shown in FIGURE 2, the surface of a wear part 20 such as an automobile brake shoe whose depth of wear is desired to be limited below a safe maximum. As shown in FIGURE 2 the wire conduits 18 are constructed and arranged in the wear part 20 below a surface 22 to be utilized for wear, at a depth 24 which is the maximum permissible wear within the wear part 20. In order to operate the sensing circuit 12 it is provided in series with a power source such as the direct power source, as for example a battery 26.

The alarm circuit 14 is a standard series circuit and is provided in series with a power source such as a battery 28 and an indicator 30 such as an alarm means as for example a standard lamp and socket or a buzzer assembly. A switch means 32 is connected in series to both the alarm circuit and the sensing circuit. The switch means is constructed and arranged to keep the sensing circuit normally closed and the alarm circuit 14 normally open. The switch means 32 which is held closed by the current flowing in the sensing circuit 12 but is constructed to be tripped by the interruption of the flow of current in the sensing circuit to close the alarm circuit 12.

The switch means 32 can be of any suitable construction as for example as shown in FIGURE 1 it can be provided with an electrical magnet 34 which electrical magnet is activated by the current flow in the sensing circuit 12. The electromagnet through the magnetic force generated therein attracts a lever 36 on the switch to cause the sensing circuit to be closed and attendantly to have current flowing there through at all times. The lever 36 is spring loaded by compression springs 36 that normally exert a force which would tend to push the lever away from the magnet 34 but which force is overcome by the magnetic force of said magnet 34. The alarm circuit is arranged in association with the sensing circuit and the switch means so that when the magnetic force on the switch means and lever is withdrawn, the springs 38 will push the lever away from the magnet 34 to cause the uppermost position of the lever to be in contact with the poles 40 of the alarm circuit to close the alarm circuit and to activate the alarm 30.

It will now be understood by those skilled in the art that the sensing circuit can be placed within a brake system of an automobile, with the activating means 16 being placed within the brake shoes of the front and rear brakes of the automobile. The alarm circuit is constructed so that the alarm means can be placed on the dashboard of the automobile, with the indicating means and wire conductors 18 positioned at the maximum depth and wear to be permitted in an automobile brake shoe. So it will be understood that as the brake shoe wears the wear surface 22 will wear down and will approach the wires 18 and in fact will reach the depth 24 to a point where the wires 18 are contacted by the brake drum and as the wear continues, the brake drum will sever the wires 18. Immediately upon the severence of the wires 18 and the cessation of current flow in the sensing circuit 12, the magnetic force in the electric magnet 34 will be stopped allowing the springs 38 to push the lever 36 in contact with the poles 40 of the alarm circuit 14 to activate the alarm circuit and thus permit current to flow in the alarm circuit. The current flow in the alarm circuit will of course activate the alarm means to indicate to the operator of the automobile that the brake shoes have reached the maximum permissible wear depth and that they should be replaced.

It will now be understood by those skilled in the art that the objects of the present invention have been achieved by providing a simple automobile brake wear indicator system that has accuracy of calibration and is relatively inexpensive to install.

We claim:

1. Apparatus for detecting the depth of wear of a brake shoe which comprises:
    (a) a sensing circuit disposed in part at a predetermined depth in said brake shoe;
    (b) said sensing circuit having in series:
        (1) a power source, and
        (2) switch means; and
    (c) an alarm circuit connected to said switch means and constructed and arranged to be activated by said means, said alarm being normally open and said sensing circuit being normally closed;
    (d) said alarm circiut having in series:
        (1) a power source; and
        (2) alarm means arranged to be actuated as the alarm circuit is actuated by said switch means;
    (e) said switch means being constructed and arranged to activate said alarm circuit when brake shoe wears to said predetermined depth.

2. Apparatus according to claim 1 wherein said sensing circuit in said brake shoe is broken to actuate said switch means and to activate said alarm means.

3. The apparatus of claim 2 wherein said alarm means is a lamp.

4. The apparatus of claim 2 wherein said alarm means is a buzzer.

5. The apparatus of claim 2 wherein said sensing circuit is broken to actuate said switch means, and to complete said alarm circuit.

References Cited

UNITED STATES PATENTS 3,297,985   1/1967   Trebonsky et al. _____ 340—69

ALVIN H. WARING, Primary Examiner

U.S. Cl. X.R.

200—61.4, 61.44